(12) United States Patent
Miller

(10) Patent No.: US 7,757,720 B1
(45) Date of Patent: Jul. 20, 2010

(54) RIBBED SPIRAL PIPE

(75) Inventor: Robert F. Miller, Lafayette, CA (US)

(73) Assignee: Pacific Roller Die Company, Inc., Hayward, CA (US)

( * ) Notice: Subject to any disclaimer, the term of this patent is extended or adjusted under 35 U.S.C. 154(b) by 137 days.

(21) Appl. No.: 12/005,434

(22) Filed: Dec. 26, 2007

Related U.S. Application Data

(63) Continuation-in-part of application No. 11/153,249, filed on Jun. 14, 2005, now abandoned.

(51) Int. Cl.
*F16L 11/16* (2006.01)
(52) U.S. Cl. ............... 138/129; 138/135; 138/122; 138/134; 138/173; 138/177; 72/49; 29/509
(58) Field of Classification Search ........... 138/135, 138/122, 121, 129, 134, 154, 173, 177, 178; 72/49, 50; 29/509
See application file for complete search history.

(56) References Cited

U.S. PATENT DOCUMENTS

| | | |
|---|---|---|
| 2,786,435 A | 3/1957 | Ellzey, Floyd P. |
| 3,247,692 A | 4/1966 | Davis |
| 3,566,643 A | 3/1971 | Westerbarkey |
| 3,621,884 A | 11/1971 | Trihey, John Massey |
| 3,677,047 A | 7/1972 | Holyoake, et al |
| 3,863,480 A | 2/1975 | Meserole, Robert H. |
| 3,865,146 A | 2/1975 | Meserole, Robert H. |
| 4,085,604 A | 4/1978 | Anderson et al. |
| 4,108,212 A | 8/1978 | Anderson et al. |
| 4,161,811 A | 7/1979 | Nyssen |
| 4,305,460 A | 12/1981 | Yampolsky |
| 4,377,188 A | 3/1983 | Siegwart |
| 4,481,978 A | 11/1984 | Escandell |
| 4,486,484 A | 12/1984 | Schafer |
| 4,790,686 A | 12/1988 | Christ et al. |
| 4,838,317 A | 6/1989 | Andre et al. |
| 4,852,616 A | 8/1989 | Holcomb |
| 5,074,138 A | 12/1991 | Miller |
| 5,158,115 A | 10/1992 | Miller |
| 5,158,814 A | 10/1992 | Foti |
| 5,768,928 A | 6/1998 | Carson |
| 6,418,971 B1 | 7/2002 | Foti et al. |

*Primary Examiner*—Patrick F Brinson
(74) *Attorney, Agent, or Firm*—Philip A. Dalton

(57) ABSTRACT

Modified-profile metal strips, and annular and spiral metal pipes and other products formed from such strips. The strips comprise a plurality of spaced longitudinal ribs of size and transverse location selected to increase the strength of a given thickness or gauge of the strip and the associated strength of a product formed from the strip.

10 Claims, 2 Drawing Sheets

RIBBED SPIRAL PIPE

This is a continuation-in-part of my application Ser. No. 11/153,249 filed Jun. 14, 2005 now abandoned.

I. BACKGROUND OF THE INVENTION

A. Field of the Invention

The present invention relates to metal strips of the type used in spiral pipes and, specifically, to annular (circumferential) pipes and spiral pipes, and to other products formed from such strips.

B. Description of the Related Art

It has long been known that forming metal increases the strength and utility of the metal. The assignee has been a leader in pursuing these effects.

With the recent introduction of construction materials such as polymers, many of the prior strength requirements which were applicable to metals have been lowered to permit greater use of materials of lesser strength. For metal materials to remain competitive, it has been necessary to use metals of lighter thickness and form. However, problems can occur in the manufacture and use of similar products using lighter or less thick metals such as steel and aluminum.

Typically pipe products such as annular pipes and spiral pipes use metal of 18 (0.048"-0.051") and heavier gauge, otherwise the profiles suffer local buckling and the pipes cannot be successfully manufactured or used. (Note, in this document, "pipe" includes "tube" and vice versa.) Examples of such products, specifically corrugated spiral pipes as well as the process for making such pipes, are disclosed in commonly assigned U.S. Pat. No. 3,247,692, which patent is hereby incorporated by reference.

The buckling usually occurs in the tangent or vertical legs that support the top and/or bottom members which function in part to supply the needed strength to the pipes. Generally speaking, the lighter the metal thickness, the greater the buckling.

In a sinusoidal profile, the tangent area keeps apart the crest and valleys (the arcs) of the sinusoidal profile. If the wall thickness is too light (thin), the tangent gives way to local buckling rather than supporting the profile and allowing it to be formed into a tubular shape.

In the square rib or oblong rib products or similarly profiled products, the local buckling likely will occur in the vertical legs of the ribs.

While conventional profiles such as those disclosed in the incorporated '692 patent are still widely used today, it is desirable to provide new metal forming techniques which alleviate the manufacturing problems associated with present metal thicknesses and profiles, by providing increased strength and utility at reduced metal thicknesses.

II. SUMMARY OF THE INVENTION

In one aspect, the present invention is embodied in a strip having length and width and comprising a first group of longitudinally extending ribs of size and transverse location selected to increase the strength of a given thickness or gauge of the strip. In another embodiment, the strip has a generally sinusoidal profile in transverse cross section and the first group of ribs includes ribs formed along the peaks and troughs of the sinusoidal profile.

In yet another embodiment, the strip has a generally planar profile in transverse cross section, the strip comprises a second group of relatively large, longitudinally extending ribs, and the first group of ribs comprises relatively small ribs and includes ribs formed in the walls of the ribs of the second group. In still another embodiment, the strip comprises metal.

In yet another aspect, the present invention is embodied in a pipe comprising an elongated metal strip having a generally sinusoidal profile in transverse cross section comprising peaks and troughs and tangents connecting adjacent peaks and troughs; the strip being wound about an axis and having length and width and opposite side edges along the length thereof; the strip being joined along the opposite side edges; and the strip further comprising longitudinally-extending ribs formed along the tangents of the sinusoidal profile. In another embodiment, the pipe also comprises longitudinally-extending ribs formed along the peaks and the troughs of the sinusoidal profile. In yet other embodiments, the strip is wound spirally or annularly about the axis.

In another aspect, the present invention is embodied in a pipe comprising an elongated metal strip having a generally planar profile in transverse cross section, the strip being wound about an axis and having length and width and opposite side edges along the length thereof; the strip being joined along the opposite side edges; the strip further comprising a first group of longitudinally extending ribs and a second group of relatively large, longitudinally extending ribs; the first group of ribs comprising relatively small ribs, including relatively small ribs formed in the walls of the ribs of the second group. In yet other embodiments, the strip is wound spirally or annularly about the axis.

In still another aspect, the present invention is embodied in a pipe comprising an elongated strip having a generally sinusoidal profile in transverse cross section comprising peaks and troughs and tangents connecting adjacent peaks and troughs; the strip being wound spirally about an axis; the strip having length and width and opposite side edges along the length thereof; the strip being joined along the opposite side edges; and the strip further comprising longitudinally-extending ribs along the peaks, the troughs and the tangents.

In another aspect, the present invention is embodied in a pipe comprising an elongated strip wound spirally or in annular fashion about an axis. The strip has length and width and opposite side edges along the length thereof. The strip is joined along the opposite edges; and the strip further comprises a first group of longitudinally extending ribs of size and transverse location selected to increase the strength of the spiral pipe for a given thickness or gauge of the strip. In another embodiment, the pipe has a generally sinusoidal profile in transverse cross section and the first group of ribs includes ribs formed along the peaks and troughs of the sinusoidal profile. In yet another embodiment, the strip has a generally planar profile in transverse cross section and further comprises a second group of relatively large, longitudinally extending ribs, and the first group of ribs comprises relatively small ribs and includes ribs formed in the walls of the ribs of the second group. In still another embodiment, the strip comprises metal.

III. BRIEF DESCRIPTION OF THE DRAWING

IV. DETAILED DESCRIPTION

Figure 1:
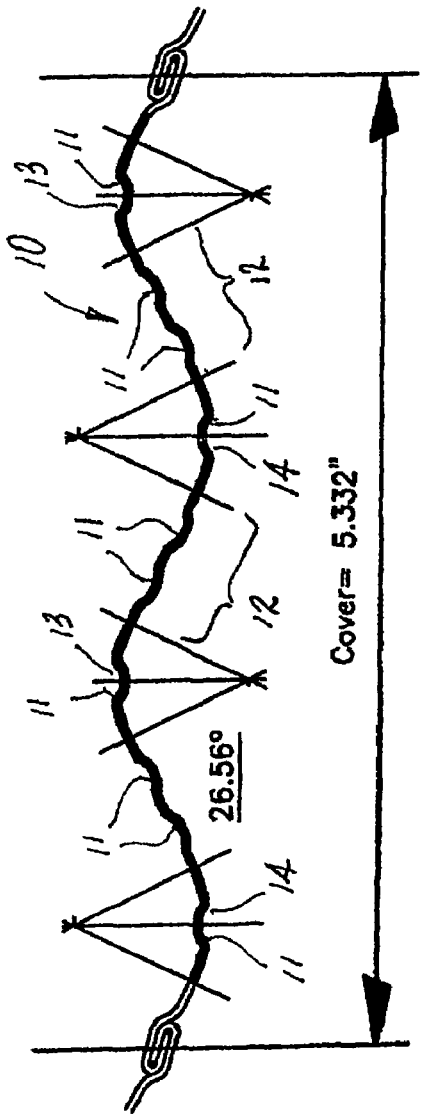
FIG. 1 depicts a transverse cross section of a modified sinusoidal profile metal strip which has formed therein spaced mini-ribs and is suitable for forming a spiral or annular corrugated pipe or other product.
Figure 2:
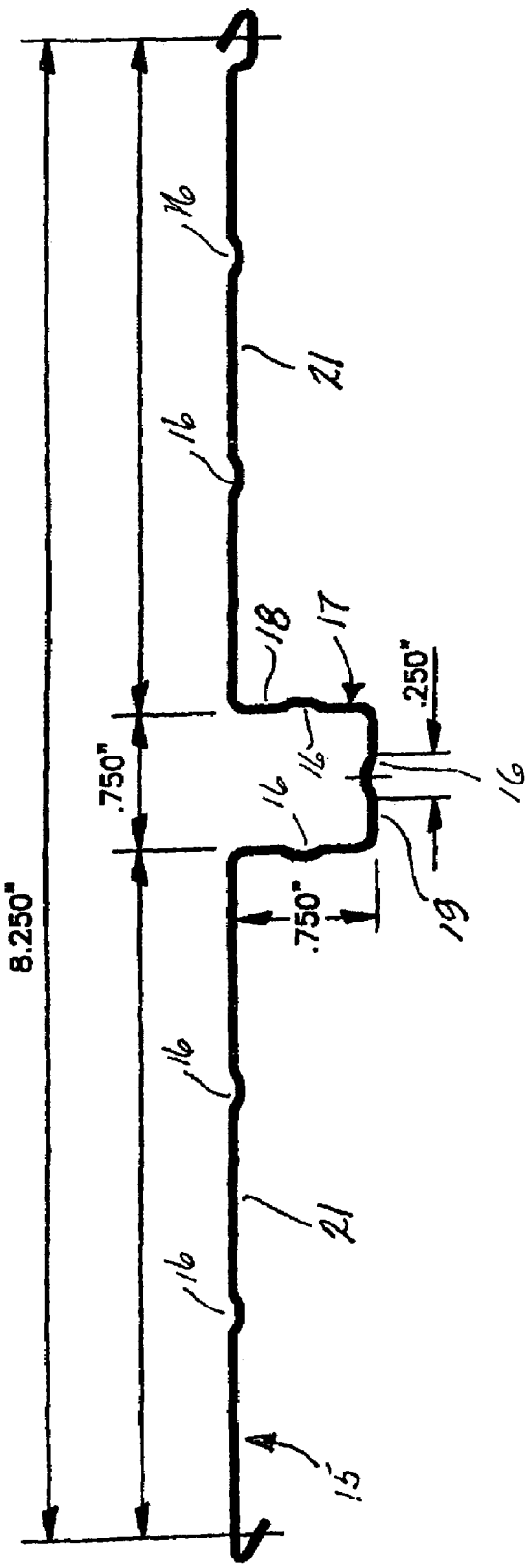
FIG. 2 depicts a transverse cross section of a modified planar-with-box-rib profile, metal strip which also comprises spaced mini-ribs and is suitable for forming a spiral or annular pipe or other product.

Referring to FIGS. 1 and 2, according to a preferred embodiment of the present invention, small ribs (also called mini-ribs or relatively small ribs) are formed in a metal strip which as described in the incorporated '692 patent is formed into a product such as a spiral tube or a corrugated spiral tube. These two drawing figures illustrate the mini-ribs or reforming of already formed profiles or sections to achieve ease of manufacturing and greater strength. FIG. 1 depicts a modified ½" deep×2⅔" pitch sinusoidal cross-section profile of a metal strip 10 which is used to form a spiral corrugated metal pipe and, as-modified, comprises spaced mini-ribs 11 which enhance the strength of the strip and the resulting pipe. FIG. 2 depicts a modified planar-with-box-rib cross-section profile of a metal strip 15 which has relatively large ¾"×¾" box ribs 17. The box rib strip 15 is used to form a spiral metal pipe and, as modified, comprises spaced, relatively small mini-ribs 16 which enhance the strength of the strip and the resulting pipe.

Preferably each relatively small rib 11 and 16 extends longitudinally along the associated strip and several (two or more) ribs are formed at spaced intervals along the transverse width of the strip and at selected locations along the sinusoidal profile, FIG. 1, and the box profile, FIG. 2.

Further regarding FIG. 1, tangent 12 keeps apart the crests 13 and valleys 14 (peaks and troughs) of the sinusoidal profile. If the wall thickness is too light, the tangent 12 gives way to local buckling, rather than supporting the profile and allowing it to be formed into a tubular shape. The small ribs 11 added to the tangent 12 provide the necessary strength to allow the tube to be formed without the buckling occurring. Similar mini-ribs 11 on the crests 13 and valleys 14 of the sinusoidal profile further reinforce the strength of the overall section.

Referring again to FIG. 2, in the box rib strip 15, the relatively small ribs 16 added to vertical legs 18 of relatively large ribs 17 provide the necessary strength to allow the tube to be formed without buckling. Similar relatively small or mini-ribs 16 in the crests 19 of the relatively large ribs 17 and along the regions 21 between the relatively large ribs further reinforce the strength of the overall section.

The mini ribs 11 and 16 increase the strength to weight ratio of the profiles and prevent buckling in lighter wall thickness profiles. Specifically, the mini ribs allow the use of wall thicknesses of 0.036" and lighter (thinner) without buckling. In addition, the ribs increase the section properties of the finished profiles to achieve higher strength to weight ratios. The section properties are section modules which help with the flexibility factor under cover load and moment of inertia which improves pipe stiffness. Of course, in addition to permitting the use of stronger and thus thinner wall pipes, the use of mini-walls 11 and 16 benefit heavier wall thickness pipes, including pipes of conventional thickness.

EXAMPLES

In one embodiment, the sinusoidal strip 10 depicted in FIG. 1 is ½" (inch)×2⅔" pitch×0.036" thick standard CMP; has 26.56° angles; and comprises a total blank of 6.922", with ribs; a material factor of 1.298, with ribs and including lock seam edges; and a cover of 5.332". As alluded to above, the ribs 11 are formed in the tangents 12, in the crests or peaks 13, and in the valleys or troughs 14 of the sinusoidal profile strip.

In one embodiment, the strip 15 depicted in FIG. 2 is 0.036" (inch) thick; and comprises a total blank of 10.622", with ribs; a material factor of 1.2875, with ribs and including lock seam edges; and cover of 8.250". The exemplary strip 15 comprises a relatively large rib 17 which is 0.750" wide and 0.750" deep and 0.036" GA; and relatively smaller ribs 16, 0.250" wide formed in the legs 18 and in the crests 19 of the rib 17 and in the regions 21 between large ribs 17.

Corrugated spiral metal pipes were formed as described in the '692 patent and using metal strips 10 which were 0.035 inch thick and 0.040 inch thick having ribs approximately 3/16 inch wide and 1/16 inch deep. Pipes were formed in 12 inch, 18 inch, 24 inch and 30 inch diameters for each of these thicknesses, and in both 10 ft. and 20 ft. lengths for each diameter and thickness. Please note, by varying the pressure on the rolls of the pipe forming apparatus, the depth of the ribs could be varied. The rib depth varied over the approximate range 1/32 inch to ⅛ inch, with a typical thickness being approximately 1/16 inch. Given the demonstrated ability to form 12" to 30" diameter pipes, it is expected that larger diameter pipes, e.g. 36" pipes and 48" pipes, can be readily formed. This is because it is expected that larger diameter pipe will be easier to form than smaller diameter pipe.

To further illustrate the application of the present invention and based upon the above discussion and examples, ribs approximately 1/16 inch to 5/16 inch wide and 1/16 inch to 5/16 inch deep (height) are suitable for forming corrugated spiral metal pipes 12 inches to 48 inches in diameter and having wall thicknesses of 0.024 inch to 0.052 inch. Other dimensions will be readily devised based upon the disclosure herein.

In addition to their applications to form metal tubular cylinders or pipes of increased strength and/or lighter gauge (lesser thickness), the modified strips according to the present invention are useful in a variety of applications and structures which utilize strips or sheets of materials, including non-metal tubes, and also including roofing, walls, siding and other construction materials.

The above and other embodiments will be readily implemented by those of usual skill in the art, limited only by the claims appended hereto.

What is claimed is:

1. A pipe comprising an elongated metal strip having a generally sinusoidal profile in transverse cross section comprising peaks and troughs and tangents connecting adjacent peaks and troughs; said strip being wound about an axis; said strip having length and width and opposite side edges along the length thereof; said strip being joined along said opposite side edges; said strip comprising longitudinally-extending ribs formed along the tangents of the sinusoidal profile for increasing the strength of the pipe.

2. The pipe of claim 1, said strip being wound spirally about said axis.

3. The pipe of claim 1, said strip being wound annularly about said axis.

4. The pipe of claim 1, further comprising longitudinally-extending ribs formed along the peaks and the troughs of the sinusoidal profile for increasing the strength of the pipe.

5. The pipe of claim 4, said strip being wound spirally about said axis.

6. The pipe of claim 4, said strip being wound annularly about said axis.

7. A pipe comprising an elongated metal strip having a generally planar profile in transverse cross section and being wound about an axis; said strip having length and width and opposite side edges along the length thereof; said strip being joined along said opposite side edges; said strip comprising a first group of relatively small, longitudinally extending ribs for increasing the strength of the pipe; said strip further comprising a second group of relatively large, longitudinally extending ribs; and said first group of relatively small ribs including ribs formed in the walls of the ribs of said second group.

8. The pipe of claim 7, said strip being wound spirally about said axis.

9. The pipe of claim 7, said strip being wound annularly about said axis.

10. A pipe comprising an elongated strip having a generally sinusoidal profile in transverse cross section comprising peaks and troughs and tangents connecting adjacent peaks and troughs; said strip being wound spirally about an axis; said strip having length and width and opposite side edges along the length thereof; said strip being joined along said opposite side edges; and said strip comprising longitudinally-extending ribs along the peaks, the troughs and the tangents for increasing the strength of the pipe.

* * * * *